United States Patent [19]

Pollock

[11] Patent Number: 4,825,055

[45] Date of Patent: Apr. 25, 1989

[54] ERROR-FREE INTEGRATION POINTING AND TRACKING

[76] Inventor: Eugene J. Pollock, 502 Dory Dr., Fort Walton Beach, Fla. 32548

[21] Appl. No.: 102,608

[22] Filed: Sep. 30, 1987

[51] Int. Cl.⁴ .................. G01S 7/46; G01S 13/58; G01S 13/06

[52] U.S. Cl. .................. 235/411; 235/412; 364/449; 364/516; 364/164; 342/73; 342/75; 318/560; 318/569

[58] Field of Search .............. 364/164, 170, 167, 174, 364/449, 516; 235/411, 412, 413; 318/560, 569; 342/67, 73, 75; 89/41.04

[56] References Cited

U.S. PATENT DOCUMENTS

| | | | |
|---|---|---|---|
| 3,984,831 | 10/1976 | Jones et al. | 364/817 |
| 4,034,208 | 7/1977 | Vaeth et al. | 235/411 |
| 4,071,744 | 1/1978 | Pollock | 364/164 |
| 4,128,837 | 12/1978 | Page | 235/412 |
| 4,148,026 | 4/1979 | Gendreu | 235/411 |
| 4,320,287 | 3/1982 | Rawicz | 235/412 |
| 4,590,476 | 5/1986 | Burkett | 235/412 |
| 4,760,397 | 7/1988 | Piccolruaz | 342/75 |

Primary Examiner—Jerry Smith
Assistant Examiner—Paul Gordon
Attorney, Agent, or Firm—Pollock, Vande Sande & Priddy

[57] ABSTRACT

An error-free pointing and tracking system is disclosed which separates the functions of pointing and tracking. Beginning with an initialized trajectory for an object, a sensor is positioned and deviations of the object position with respect to the sensor are noted. To the extent these deviations are trended, the gain of a trajectory correction algorithm is adjusted. Based on the adaptive gain trajectory correction algorithm, a new position estimate is determined. The new position estimate is corrected for servo lag error by referring to a predefined correlation between at least the acceleration term of the trajectory and prerecorded servo lag error. The position estimate, corrected for servo lag is used to then point the sensor.

13 Claims, 5 Drawing Sheets

ERROR-FREE INTEGRATION POINTING AND TRACKING

DESCRIPTION

1. Field of the Invention

The invention relates to an improved pointing and tracking system.

2. Background Art

Applicant's prior U.S. Pat. No. 4,071,744 (the disclosure of which is incorporated by this reference), discloses a loop integration control system which was a substantial improvement on the then-existing state of the prior art. The patent disclosed an improvement in point and tracking, where it was desired to track the position of an independent remote object. The patent was based on the recognition that most pointing and tracking systems require the use of five utilities. They are (1) differentiation, to compute the dependent variables (position derivatives, velocity and acceleration) as a function of the independent variable, time, (2) integration, to predict or estimate a future position of an object being tracked, (3) a servomechanism, either mechanical or electronic, to move the sensor to the predicted position of the object being tracked, (4) encoders, or secondary sensors, which describe the location in space to which the system mount (on which a primary sensor is installed and by which it is pointed) points to the center, and (5) the (primary) sensor, which tells whether or not the track point, the position to which the sensor is actually pointed, does or does not coincide with the position of the object being tracked. The difference between traditional estimation processes (derivative control) and the process (integration control) described in applicant's U.S. Pat. No. 4,071,744 was the sequence in which these utilities are employed.

The traditional estimation technology (derivative control) performed its derivative processing before its integration process could begin. The derivative control technology injects the sensor measurement directly into the servo loop and is forced to compute its derivatives based on data derived from the encoder. Because the output of the sensor was injected directly into the servo, the actual sensor measurement is no longer available for any other purpose.

One of the major discrepancies (between sensor pointing and object position) not adequately handled by traditional estimation technology is dynamic lag which results in the sensor necessarily following the object (as opposed to pointing at the object). The actual sensor/object relationship is unknown and is therefore not available in the estimation process. Dynamic lag must be ignored in the estimation process. If not adequately handled, and it was not handled in traditional estimation technology, dynamic lag which depends primarily on the dynamics of the object being tracked, can grow to prohibitively large values.

In contrast, the integration control of U.S. Pat. No. 4,071,744 first performs an estimation or prediction of future object position from its trajectory memory and only then adjusts the memory to attempt to maintain the sensor pointed at the object being tracked. Integration control completely avoids dynamic lag by pointing the sensor exactly at the object being tracked. The derivative processes are then only used to adjust the trajectory memory. The sequence of these processes, integration first and then derivation process, results in a large noise improvement. It was assumed (in the system described in U.S. Pat. No. 4,071,744) that because the integration control was essentially noise-free, another form of potential error, servo lag, would not be present. It turned out that this was a wistful assumption, and it is a major object of the present invention to overcome this servo lag. In the traditional estimation technology, because the dynamic lag so often overshadows servo lag, the latter can be ignored. However, the system described in U.S. Pat. No. 4,071,744 essentially eliminated dynamic lag and thus in practicing the invention of U.S. Pat. No. 4,071,744 servo lag becomes of prime consideration.

In accordance with the present invention, the method and apparatus of U.S. Pat. No. 4,071,744 is modified in several respects. As described in U.S. Pat. No. 4,071,744 the trajectory of the object being tracked has four components (for each degree of freedom of object motion—for example for each of three mutually orthogonal position coordinates), these components are acceleration, velocity, position and time (although the latter is of course common to all coordinates). In accordance with the present invention, a servo lag detector is added to the apparatus of U.S. Pat. No. 4,071,744. The servo lag detector responds to three inputs. A first input is provided by the servo encoder which identifies the position to which the sensor is being pointed by the servo. A second input is the predicted track point (as corrected for system errors). In the absence of servo lag these two inputs should agree. It is thus an important feature of the present invention that the presence of servo lag error can be detected, measured and reported. A further function of the servo detector is to correct for servo lag error. This correction is achieved as a function of the third input to the servo lag detector which monitors the most recent object state vector. Based on the object state vector (in a manner to be described), servo lag error is derived, inverted and added to the error corrected track point. As thus modified, the apparatus of the present invention overcomes servo lag with a number of beneficial effects. One of these beneficial effects is that the product detector 38 of the apparatus shown in U.S. Pat. No. 4,071,744 is now a maneuver detector. This detector can now report on changes in acceleration of the object being tracked. The ability to detect a maneuver, or a change in acceleration of the object being tracked, is another important feature of the present invention, as will be described below.

In order to exhibit zero servo lag, at any given epoch, the input and output of the servo system must be identical, in other words, the response of the servo system, as noted by its encoder output must be the same as the input. Servo lag in the apparatus of U.S. Pat. No. 4,071,744 was discovered and eliminated by use of the lag detector of this invention. The major lags discovered were largely associated with the acceleration terms in the trajectory, but lags other than acceleration were also noted, i.e. both velocity and even position lag terms were noted. It was this discovery which underlined the requirement for observing the absence of lag during the course of operation in order to achieve the desired error-free and noise-free performance.

Regardless of how well a servo is calibrated, but without the lag detector, once in operation there is no valid way of observing whether or not the servo is performing as expected.

In order for the servo system to provide the required response, e.g. agreement between input and output, an infinite servo coefficient ($K_n$) is required for each term in the trajectory (position, velocity and acceleration) to achieve zero lag. Any physically realized servo however cannot have infinite coefficients because of stability considerations. Well defined analog servos can be expected to achieve infinite position ($K_p$) and velocity ($K_v$) coefficients but the best practical acceleration coefficient ($K_a$) is far short of infinite. A limitation on this acceleration coefficient means that even in a well designed type 2 servo system, there will always be lag because of acceleration in the input. Accordingly, some other factor must be introduced to force the acceleration function if a servo lag-free response is to be achieved.

This other factor is the third input to the servo lag detector and is based on the most recent state vector. In the course of system calibration, each axis of the servo is evaluated, typically azimuth, elevation and range. A high performance synthetic trajectory is used to generate a servo command, during the course of calibration, to move the mount for the track point sequence. Servo lag errors are observed by the lag detector as the servo is driven by the synthetic trajectory. Preferably, the synthetic trajectory must exceed the dynamics of the most active and violent object whose tracking is purified. The servo lag values (the difference between the encoder input to the servo lag detector and the predicted track point during the course of calibration) is recorded. In the simplest case this can be recorded as a function of state vector acceleration term. The process is repeated (using the previously recorded value to generate a servo lag inverse which is added to the predicted track point) and the servo lag error is modified until the servo lag has been reduced to zero. Once this calibration is effected, the result of the recording is a table or predetermination of servo lag error as a function of the acceleration term of the state vector. Thereafter during actual object tracking, the servo lag detector receives, as its third input, the current acceleration term for the object being tracked. This acceleration term is used to enter the table and extract the corresponding servo lag value. From this servo lag value an inverse is generated and added to the predicted track point to correct for servo lag.

In the event that there are servo lags which are a function not only of acceleration, but perhaps of velocity (and even perhaps position), then the same procedure is employed, e.g. a table is built of measured servo lag as a function of acceleration, velocity and position. Thereafter, during the course of object tracking, the most recent state vector is used as an input to the servo lag detector to generate a servo lag value, and that value is used to generate an inverse which is added to the predicted track point to correct for servo lag.

Proper system calibration is of course a requirement to generate the proper servo lag values for use in object tracking. In addition to correcting for servo lag, the system of U.S. Pat. No. 4,071,744 described correction for system errors. Both servo lag and system errors must be physically measured against a standard whose resolution is greater than that of the pointing and tracking system, e.g. one in which the RMS or remaining uncertainty or error is less than the precision of the object pointing and tracking system so that it cannot affect the measurement process. For system calibration purposes a long focal length optical sensor of relatively small aperture is installed on each system. The precision of the optical sensor can easily be made better than that of the primary sensor and its associated encoders thus allowing the system to be made error-free. Calibration in terms of azimuth and elevation can be based on the stellar environment and specifically the relative location of optical stars. A star catalog is used which maintains approximately 600 stars to magnitude 6. The catalog is effective to calibrate anywhere on the planet. Its origin is the geocenter and its magnitude is sufficient to calibrate day or night. Each mount and its encoders are calibrated optically and calibration is validated by pointing to a reasonable number of computer-selected random stars throughout the hemisphere of view to the precision of the system without error. After optical validation a calibration target is tracked which is observable by both the optical and the primary sensor. The primary sensor's output is compared with the reference optical sensor and then adjusted for agreement. A suggested technique for this calibration is the use of a controllable vehicle (helicopter) with a suspended spherical target which is readily detected by the optical reference and the primary sensor (such as a microwave radar, laser tracker, etc.).

As described in U.S. Pat. No. 4,071,744 an initial state vector consisting of time, position, velocity and acceleration is determined which is used as an initialization for the loop integration control system. To update the state vector to the epoch of observation, the acceleration variable of the state vector is integrated once to produce a new velocity and integrated again to give distance which when added to the old position gives a new position for that future time when the next position measurement is to be made. The sensor data is then compared with the estimated position computed to the epoch of the position measurement. If computed position is incorrect, the total state vector is adjusted until the position exactly fits the sensor measurement. With each new comparison and state vector modification the accuracy of the state vector increases. Within the integration process the major deficiencies associated with the differentiation process are overcome in that the state vector represents an exact description of the trajectory at discrete times and the total state vector is checked by observing whether its integrated results correspond with the actual data from the sensor.

The loop integration control system of U.S. Pat. No. 4,071,744 teaches how a predicted track point value is determined by updating the state vector until it generates a predicted track point which converges with the actual object position as measured by the primary sensor.

The apparatus of U.S. Pat. No. 4,071,744 is modified by adding to it a servo lag detector. The servo lag detector has two functions. A first function of the servo lag detector is to correct the predicted track point for servo lag. This correction is based on predefined data generated during the course of system calibration and correlated to one or more parameters of the state vector. The most recent estimate of state vector is available from the numerical integrator described in U.S. Pat. No. 4,071,744. Thus prerecorded or predetermined data can be accessed by the servo lag detector with the present state vector (or a component) as an index to generate a servo lag inverse term which can be used to modify the predicted track point. The modified track point (modified by use of the servo lag inverse) is then used to drive the servo system. Agreement between the modified, corrected track point and the actual object position (as determined by the primary sensor) is monitored. As described in U.S. Pat. No. 4,071,744 sequential samples of the sensor output are multiplied together. Agreement between the modified, corrected track point and object position is revealed by the sequential products illustrating essentially random errors.

For any position coordinate, the difference between modified, corrected, predicted track point and actual object position should alternate in sign. Failure to achieve this condition indicates a process to correct the trajectory. If the condition is achieved, however, then the servo is being driven error-free, e.g. input and output are exactly equal (to within the system precision).

When the present invention is employed, the sequential multiplier 38 (of U.S. Pat. No. 4,071,744) can be used as a maneuver detector. With the servo input and output identical, so long as the trajectory describes object motion, there will not be a trended (non-random) difference in sequential samples from the subtractor 34 (or its equivalent). When there is a trended difference then trajectory adjustment is initiated to modify the trajectory to account for the change in object motion evidenced by the trended difference. In the absence of a maneuver, there should be no servo lag.

The second function of the servo lag detector is to compare the modified, corrected, predicted track point with the output of the servo encoders. A significant difference between these quantities (in the absence of a maneuver) identifies the presence of servo lag and can be used as an indicator of the health of the system.

Accordingly, the invention provides a method of tracking a remote object using a sensor positioned by a servomechanism, said method comprising the steps of:
(a) predetermining, for said servomechanism, servo lag in accordance with one or more of object acceleration, velocity or position,
(b) tracking said object with said sensor, and in the course of said tracking generating an estimate of acceleration, velocity and position of said object,
(c) based on said predetermining step, generating a quantity representing servo lag from one or more of the estimates of acceleration, velocity and position from step (b), and
(d) modifying said estimated position by said quantity generated in said step (c).

The invention also provides a method of tracking a remote object using a sensor positioned by a servomechanism which servomechanism includes an encoder for generating signals representing sensor pointing, said method comprising the steps of:
(a) tracking said object with said sensor by:
(a1) generating, from an output of said sensor, signals representing a difference between object position and sensor pointing,
(a2) in the event a difference of said step (a1) is a trended difference:
(a3) using said difference to correct a trajectory estimate, where each trajectory estimate includes terms for acceleration, velocity and position,
(a4) estimating object position based on a trajectory estimate, where said trajectory estimate is either a trajcetory estimate corrected as recited in step (a3) or a prior trajectory estimate if no trajectory correction per step (a3) is required,
(a5) correcting said estimated position based on a predetermined system error model to generate a corrected estimated position,
(b) comparing said corrected estimated position of said object with said encoder generated signals, and
(c) indicating presence of a servo lag error in the event said corrected estimated position disagrees with said encoder generated signals.

BRIEF DESCRIPTION OF THE DRAWINGS

The invention will now be further described in the following portions of this specification when taken in conjunction with the attached drawings in which like reference characters identify identical apparatus and which.

DETAILED DESCRIPTION OF PREFERRED EMBODIMENTS

Figure 1:
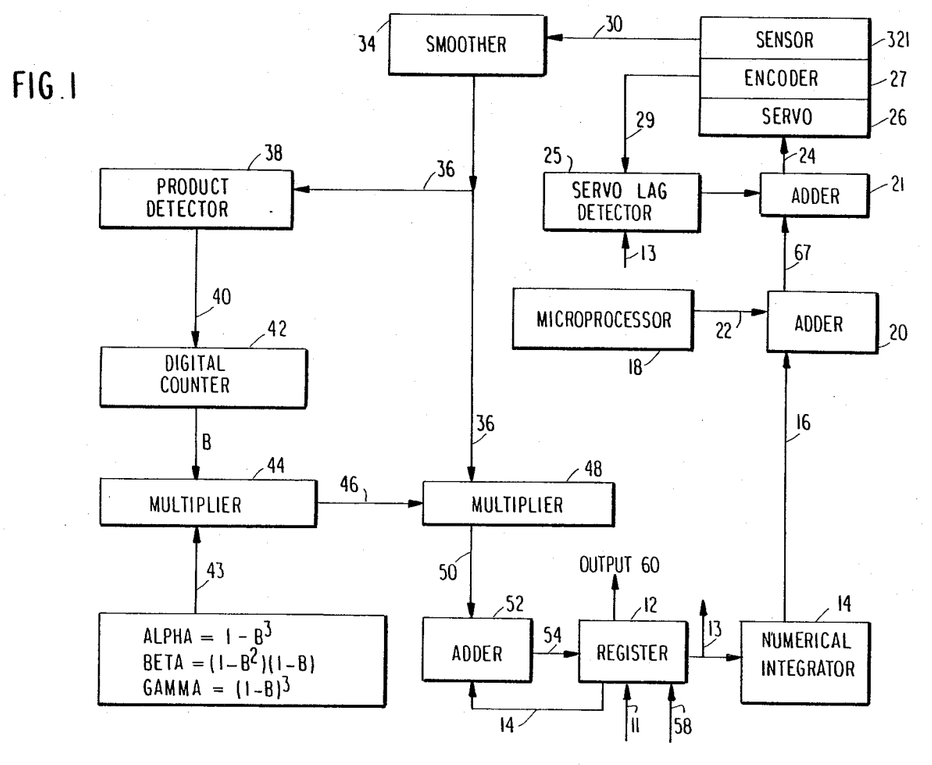
FIG. 1 is a block diagram of one embodiment of an error-free integration pointing and tracking system in accordance with the present invention drawn so as to emphasize several differences with respect to my U.S. Pat. No. 4,071,744.

FIG. 1 is a block diagram of one embodiment of the invention which is drawn so as to emphasize the improvements over that shown in U.S. Pat. No. 4,071,744. FIG. 1 is thus drawn along the same lines as in the figure of U.S. Pat. No. 4,071,744 with however, several changes. Of prime significance is the presence, in FIG. 1 of this application, of an explicit showing for the servomechanism 26 on which the sensor 32 is mounted and by which the sensor 32 is positioned. The servomechanism, although present as an implied element in the system of U.S. Pat. No. 4,071,744, was not specifically identified except for its digital storage register 26 which, in U.S. Pat. No. 4,071,744, stored the servomechanism command. FIG. 1 also shows the servomechanism encoder 27 which generates signals identifying the point at which the sensor 32 is pointed by the servomechanism 26. In addition, FIG. 1 shows a servo lag detector 25 with a first input 29 from the encoder 27, and a second input 13 from the register 12. The input 13 will be discussed below. The servo lag detector 25 provides an output to an adder 21 which receives, as another input, the output of adder 20.

In accordance with the system described in U.S. Pat. No. 4,071,744, a numerical integrator 14 produces a position estimate 16, for the object being tracked. The position estimate 16 was corrected, in the adder 20, to eliminate system errors. Thus the output 67 of the adder 20 could be considered a system error corrected position estimate of the object being tracked. This was the quantity employed in the system of U.S. Pat. No. 4,071,744 to drive the servomechanism for properly positioning the sensor 32. In accordance with the present invention, however, the output 67 is modified by the adder 21, in an amount determined by the output of the servo lag detector 25. Thus the output 24 of the adder 21 is not only system error corrected, but as will be described below servo lag corrected. As will be described, to the extent that the trajectory of the object being tracked does not change throughout some observation period, then the inputs and outputs to the servo 26 (the output 24 and the output 29 of the encoder 27) will be identical.

One of the functions of the servo lag detector 25 is, in the event these two outputs are not identical, to indicate a difference therebetween. Under certain circumstances, this can identify the fact that the system is not operating correctly and in other words an output of the servo lag detector 25 may, under certain circumstances, constitute a state of health indicator for the system. This is a function that is previously unknown in pointing and tracking systems. The reason for this will be described hereinafter.

Figure 2:
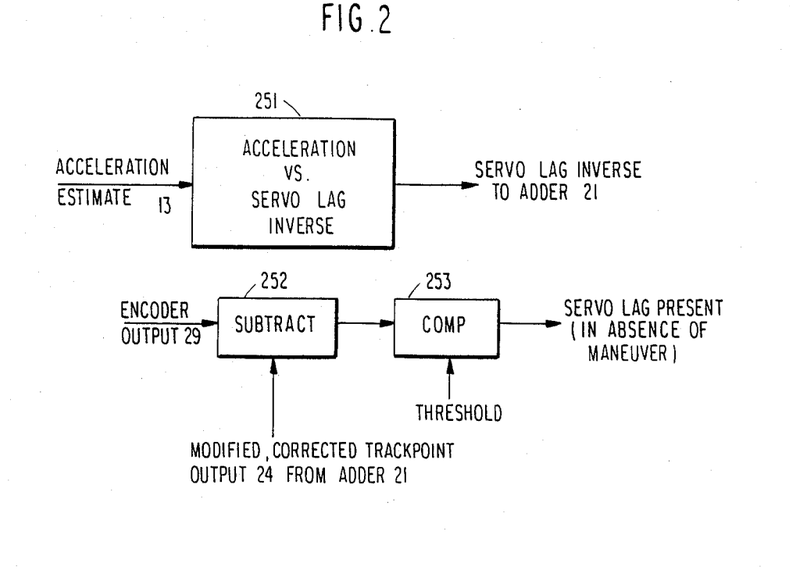
FIG. 2 is a detailed block diagram of the servo lag detector 25, an element shown in FIG. 1.

A more detailed block diagram of the servo lag detector is shown in FIG. 2.

As shown in FIG. 2 the two functions of the servo lag detector 25, that is generation of a servo lag inverse and detection of the presence of servo lag are performed by the data processor 251 (with an input from the register 12), the subtractor 252 and comparator 253. Data processor 251 has access to calibration information identifying servo lag inverse values as a function of object trajectory. In the simplest case, servo lag is merely a function of object acceleration. The register 12 stores the corrected updated trajectory information. The acceleration component of output 13 is used, as an input to the data processor 251 to derive the servo lag inverse. In the course of calibration, as will be described, data was generated to measure servo lag as a function of object trajectory. From the servo lag, servo lag inverses are determined and stored in the data processor 251. In this simple example the data processor 251 can merely be a memory, addressed by the acceleration estimate, to derive servo lag inverses.

The other function of the servo lag detector 25 is to detect the presence of servo lag. For this purpose, one input to the servo lag detector 25 is the output 29 of the encoder 27; as shown in FIG. 2 this is input to a subtracting element 252. The other input to the subtracting element is the corrected predicted track point (from the adder 20) as modified by the servo lag inverse, in adder 21. In the event these two signals agree, then the output of the subtracting element 252 is zero. Any disagreement represents a potential servo lag, and a corresponding value is input to the comparing element 253. The comparing element can compare its input, from the subtracting element 252 to some predefined threshold. In the event the input to the comparing element 253 from the subtract element 252 is greater than the threshold, then the output of the comparator 253 identifies the potential presence of servo lag. As has been described, however, during the course of a maneuver there may be apparent servo lag merely because the trajectory has not yet been properly corrected. Accordingly, the output of the comparing element 253 is only a conditional indicator of servo lag and more particularly servo lag is only indicated in the absence of a maneuver.

Applicant believes that the servo lag, in both of its functions, is a unique element in the art of pointing and tracking. In the first place, it identifies the presence of servo lag, something that was not detectable in accordance with prior art pointing and tracking systems. Furthermore, the servo lag detector quantifies the amount of servo lag and corrects for that lag so as to provide an error-free (to within the precision of the system) output for driving the servomechanism.

From the foregoing description, and the description contained in applicant's U.S. Pat. No. 4,071,744, operation of the apparatus shown in FIG. 1 should be readily apparent to those skilled in the art.

Figure 3:
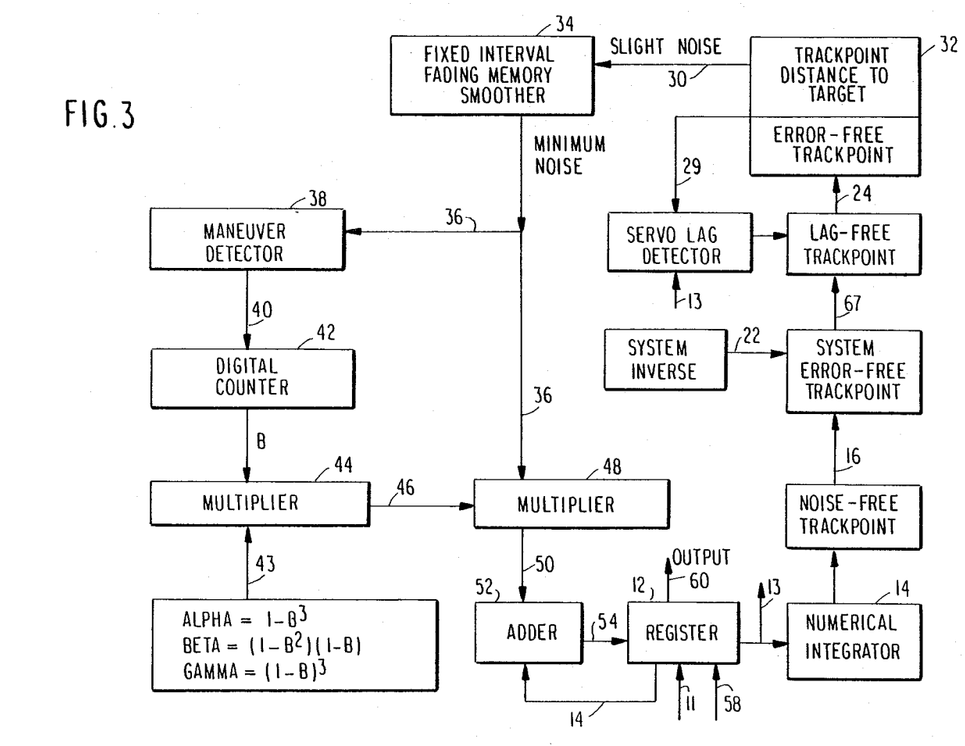
FIG. 3 is similar to FIG. 1 although useful in explaining the functions of the various elements.

However, in order to gain a better understanding of the invention, the functional block diagram of FIG. 3 is presented.

The elements in FIG. 3 have retained the reference characters used in connection with FIG. 1 so as to readily correlate the functions performed by the elements in FIG. 3 with the hardware (of FIG. 1) which performs those functions.

The system disclosed in FIGS. 1 and 3 is referred to as performing error-free integration pointing and tracking, and is also referred to as LINC II (to differentiate it from the system described in U.S. Pat. No. 4,071,744). Two of the most significant errors in prior art pointing and tracking systems and (1) dynamic lag, and (2) servo lag. Two other sources of error which have been addressed in the prior art are system errors and noise. System errors can be properly handled by appropriate calibration. Appropriate calibration is another short coming of the prior art and is more particularly described hereinafter. Various procedures can be used to minimize the effect of noise, especially in accordance with applicant's U.S. Pat. No. 4,071,744 and the present invention. Conventional prior art techniques are typically inappropriate with respect to noise since they can be characterized as primarily derivation processes which enhance the effects of noise. In accordance with this invention (as is the case in connection with U.S. Pat. No. 4,071,744) the primarily integration aspect of this invention does not have an advantage in minimizing the effect of noise.

My U.S. Pat. No. 4,071,744 taught effective techniques for limiting system errors and dynamic errors. The present invention has an advantage over U.S. Pat. No. 4,071,744 in teaching containment or at least control for servo lag.

Referring again to FIG. 3, the primary sensor (such as a microwave radar or any other device which provides a signal for each degree of freedom of movement of the object) produces an output 30. The output 30 quantizes an offset between the predicted track point (the point at which the sensor is directed by the servo 26) and the sensor's measurement of target position. The output 30 is input to the smoother 34. The output of the sensor 32, the signal 30, is subjected to a slight amount of noise. This quantum of noise is reduced by the smoother 34. As suggested in FIG. 3, the smoother 34 may be a fixed interval fading memory smoother. In such a device, a given number n of sequential outputs from the sensor 32 are summed. Each of the outputs from the sensor is produced periodically so that n outputs which are summed cover a fixed interval of time. The smoother 34 is referred to as a fading memory smoother since it smooths the last n outputs of the sensor 32. For example at time $t_x$, the previous n outputs could be referred to as $30_0$–$30_{n-1}$. Thus at time $t_x$, the output of the smoother 34 is a function of outputs $30_0$–$30_{n-1}$. After the next output of the sensor 32, at time $t_{x+1}$, the smoother 34 drops the output $30_0$ and takes into account output $30_n$, so that the output of the smoother 34 at time $t_{x+1}$ is a function of $30_1$–$30_n$. We will also refer to the output of the smoother 34 as $\overline{S}$ (where indicates the smoothed nature of the sample). Periodically the output of the smoother 34 is sampled, and sequential samples are multiplied together by the product detector 38 (referred to as the maneuver detector 38 in FIG. 3). If the ultimate output of the error-free pointing and tracking, the track point, coincides with the actual object position, then the difference between sequential samples of the output of smoother 34 will vary in sign. The product detector 38 multiplies two sequential samples together, e.g. it forms $\bar{S}_1*\bar{S}_2$. When sample $\bar{S}_3$ is available, it forms the product of $\bar{S}_2*\bar{S}_3$, and so on. The products should not be trended if the track point is correct. Thus, if the track point is correct the sign of the product should be negative. A negative product represents relatively random samples whereas positive signs represent trended samples. Sequential outputs of the product detector (or maneuver detector) 38 are used as the input to a digital counter 42. As indicated in U.S. Pat. No. 4,071,744, the counter 42 is used to generate a B number which is used as an adaptive gain signal, e.g. an operator whose value is large when the tracking data are random and small when that data are trended. The B number is employed in the multiplier 44 along with the polynomial equations shown in FIG. 3 (which are identical to the equations described in U.S. Pat. No. 4,071,744) to produce or modify the three adaptive gain weighting factors where $\alpha$ is the basic (position) multiplier, $\beta$ is the first derivative (or velocity) multiplier and $\gamma$ is the second derivative (or acceleration) multiplier. These multipliers are input to the multiplier 48 wherein they are multiplied by the appropriate output of the smoother 34 (one of the samples $\bar{S}_1$, etc.). The product, the signal 50, is used as one input to the adder 52 to correct the state vector to produce a new state vector 54 which is input to the register 12. The updated state vector 54 stored in register 12 includes terms for estimated position velocity and acceleration. These terms are initialized by input 58 which may be any estimate of an object's state vector at the time it is initially to be tracked by the error-free pointing and tracking system of the invention. Through the process so far described, new estimates for the state vector terms of acceleration, velocity and position are continually updated. The acceleration estimate, the signal 13, is input to a numerical integrator 14. The output 16 of the numerical integrator 14 is an estimated future position measurement, and is referred to as a noise-free track point, e.g. a noise-free estimate of the object's position. The microprocessor 18 (see FIG. 1) outputs a signal 22 corresponding to system errors. In particular the signal 22 corresponds to system inverses, a signal which when added to the noise-free track point 16 produces a corrected track point or a system error-free track point 67. The system error-free track point 67 is input to the adder 21 wherein it is modified by an appropriate servo lag inverse. The servo lag inverse is generated as already described by relying on (for example) the latest acceleration estimate for the object. The output 24 of the adder 21 is referred to as lag-free track point. For reasons already described, this is also an error-free track point, e.g. free of system errors, dynamic lag and servo lag errors. The output 24 is used to drive the servos 26, and it is the output 29 of encoder 27 which is the other input to the servo lag detector 25.

Figure 4:
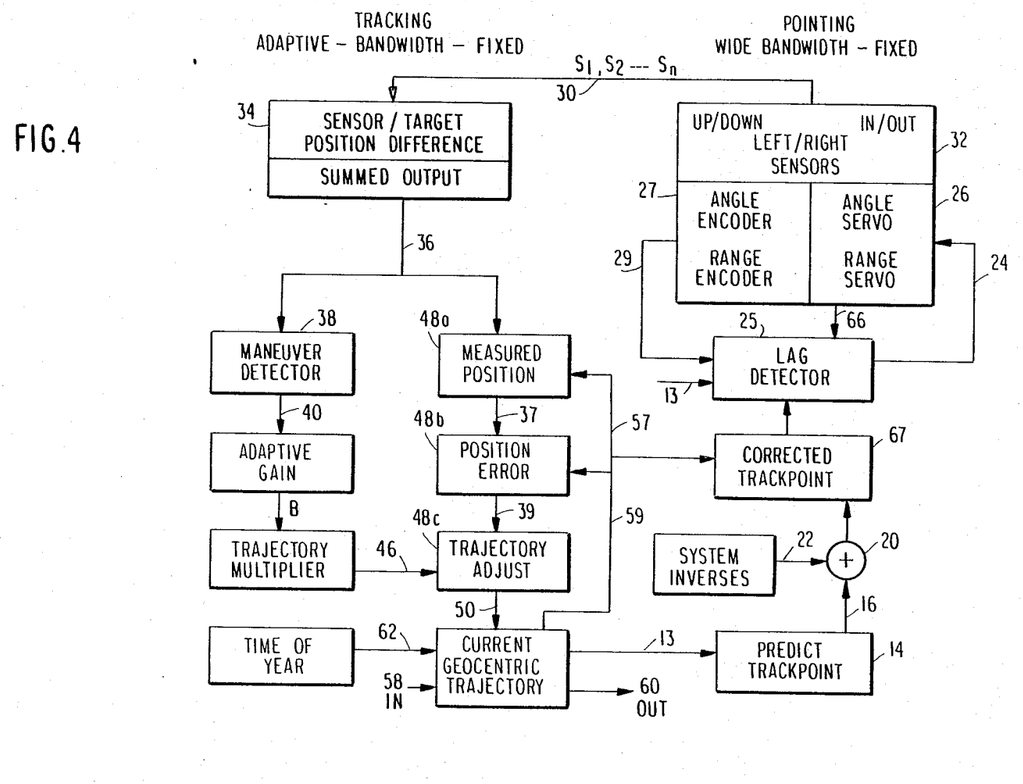
FIG. 4 is useful in explaining the different functions of pointing and tracking.

FIG. 4 illustrates, in block diagram form, the two processes, pointing and tracking, and the interconnections therebetween. As shown in FIG. 4 the pointing process is a wide, but fixed, bandwidth system. The tracking process on the other hand has an adaptive bandwidth between upper and lower fixed limits.

The pointing process, to position the servos 26, requires a predicted object position or track point. This is developed by numerically integrating the current trajectory estimate (in the numerical integrator 14). The result of that process is a predicted track point 16 which is corrected for system errors in the adder 20 resulting in a corrected track point 67 (sometimes referred to as $O_{67}$). This corrected track point is further modified by the lag detector 25, and the adder 21 to produce a modified, corrected position or track point $O_{24}$ which is the command used to drive the servos 26. As a result of the command, the servos 26 position the sensor 32. The sensor 32, in turn outputs the sequence of signals related to the difference between the modified, corrected track point and the actual position of the object. The sequence of signals are conducted by the line 30 (of FIG. 4) to the smoother 34. The smoother 34, using a fading memory technique, sums a given number of the signals $S_1, S_2, \ldots S_n$ to form the sequence of smooth signals $\bar{S}_1, \bar{S}_2, \ldots$ e,ovs/S/ $_n$. These smoothed signals are then applied to two different chains, via the conductor 36. In one chain the signals are employed, along with signals to be defined, to generate a position error estimate. The position error estimate is one of the quantities used in the trajectory adjustment process. The other quantity required for the trajectory adjustment process is the gain which is determined in the other chain fed by the conductor 36. The first element, the maneuver detector or product detector 38, multiplies sequential pairs of the smoothed outputs, e.g. $\bar{S}_1*\bar{S}_2$, and then $\bar{S}_2*\bar{S}_3$, and then $\bar{S}_3*\bar{S}_4$, and so on. If the trajectory has been adjusted, in previous cycles, to accurately depict the object's motion, then the smoothed signals will not indicate a trended difference, e.g. the modified, corrected position estimate will oscillate about the actual object position. This will be reflected in the sign of the sequential products, either all negative signs (to indicate that the modified, corrected track point is oscillating about the actual object position) or mostly products of negative sign. On the other hand, if the latest trajectory estimate does not accurately reflect the motion of the object, then these differences will be trended and sequential products will have all positive or generally positive signs. The signs of the products are used to control the counter 42. For each instance of a negative sign, the counter is incremented, and for each instance of a positive sign the counter is decremented. In order to maintain this oscillatory action, an upper limit of the counter is set at some predetermined positive number (thereby ensuring some minimum gain for the trajectory adjustment algorithm). On the other hand, for each instance of a positive sign in these products formed by the product detector or multiplier 38, the counter 42 is decremented. The status or contents of the counter is employed as the B number which determines the gain of the trajectory correction algorithm.

The other quantity, the measured position error, to drive the trajectory correction algorithm is obtained as follows. Each of the smoothed signals $\bar{S}_1$, etc. represents a certain position error. To determine that error, a current measured position is first formed by summing with a current smoothed signal output $\bar{S}_n$, for example, with the corrected track point $O_{67}$ in the block 48a. The output ($O_{67}+\bar{S}_n$) is input to the block 48b to determine a position error by determining the difference between the measured position and the last position predicted by the trajectory ($O_{59}$). The position error $O_{39}=(O_{59}$-

$-(O_{67}+\bar{S}_n))$ is then input to the trajectory adjustment algorithm 48c to output a current trajectory.

Figure 5:
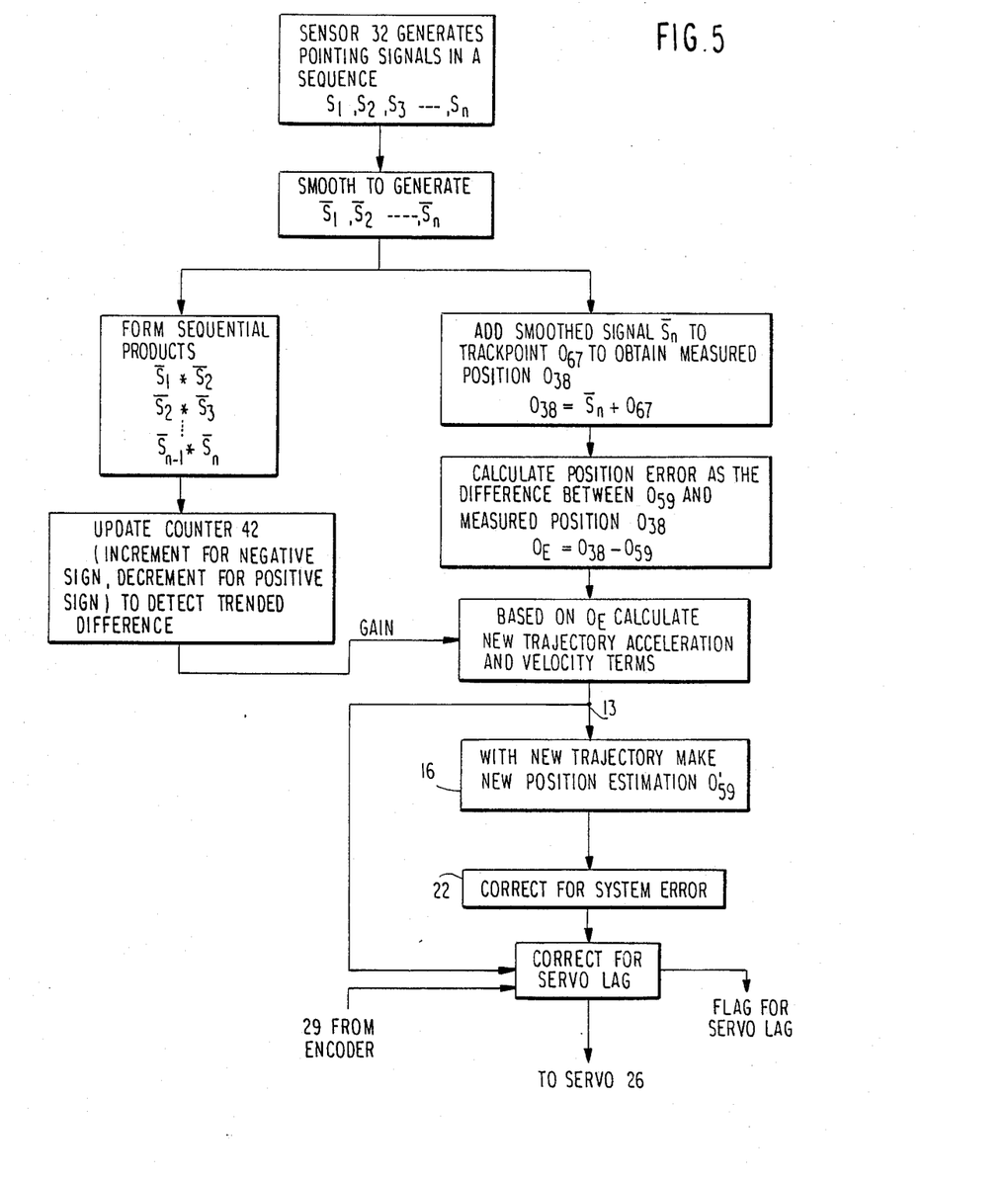
FIG. 5 is a flow chart type description of how sensor data is employed to effect trajectory correction, where necessary.

For convenience, a similar flow diagram is shown in FIG. 5.

Calibration

LINC II pointing is lag-free, and a complete system error model is generated and its inverse is inserted into the track point sequence (as already described) so that the system is made error-free. These error model inverses are themselves dynamic and are separately calculated for each track point in the pointing drive sequence.

Each of the error model terms must be physically measured against a standard whose resolution is greater than that of the LINC II such that the RMS of the remaining uncertainty or error is less than the precision of the LINC II device and cannot affect its measurement process, e.g. it is error-free.

In order to implement system calibration, a long focal length optical sensor of relatively small aperture is installed on each LINC II. The precision of the optical sensor can easily be made better than any microwave sensor and its angle encoders thus allowing the system to be made error-free. Optical stars are used to calibrate the optical sensor and the mount on which both sensors are installed.

A complete LINC II system error model can be divided into three parts, environmental, dynamic and orientation error terms.

Environmental errors, when tracking a dynamic object are primarily the effects of refraction. There are two widely separated spectrum sensors involved and the refraction effect must be determined as a function of each sensor operating frequency. The effects of refraction are computed from temperature and atmospheric pressure measured at the LINC II and used in the widely known and used ray trace integral technique. The accuracy of the refraction correction is more than adequate for the precision required.

Dynamic errors, primarily transit time, is the displacement of the object during the time that an echo (for example from a microwave sensor) is returning to the tracker from the object. The transit time correction is based on current trajectory precision and will impose no limitation on system precision.

Orientation errors result from sensor geocentric orthogonality inaccuracies. The orientation corrections to calibrate the mount and its angles require the use of an external reference system. The angle orientation terms are composed of at least nine separate physical terms, three for the primary sensor, three for the optical sensor and three for the mount on which both sensors are installed. Each orientation term is independently and physically observed and recursively adjusted to maintain orthogonality as well as precision. If all LINC II sensors are to give precisely the same trajectory from the same object, they must all be exactly oriented on the same physical standard. The one universal standard against which this orientation can be modelled is the stellar environment and specifically the relative location of optical stars. The stars are the universal standard, precise and accurate enough to support the most exacting position requirements. The relative position of the stars are known to better than two microradians. A star catalog is used which maintains approximately 600 stars to magnitude six. This catalog is sufficient to calibrate anywhere on the planet. Its origin is at the geocenter, and its magnitude is sufficient to calibrate day or night. Each mount and especially its encoders are first calibrated optically. As will be described, rather than using a polar or coordinate system, a preferred cartesian coordinate system for LINC II is up/down, in/out and left/right. To effect this calibration, east, north and up are determined. Then the optical sensor orientation is determined. Optical droop, skew and non-orthogonality are measured. Preferably optical calibration is not considered valid until accuracy has been demonstrated by pointing at least 20 computer-selected random stars throughout its hemisphere of view to the precision of the system. After optical validation, an object is tracked which is observable by both optical and the primary sensor (for example a microwave system). The primary sensor output is compared to the reference optical sensor. The primary sensor is then adjusted for agreement. Primary sensor calibration must be considered valid throughout the hemisphere of view.

Accuracy is limited primarily by the precision of the mount encoders and track point data rate. The system is calibrated to the precision of the angle and range encoders. An inverse of each term of the error model is added to the track point sequence, and since the track point is noise-free and lag-free, the process is now error-free.

Networking

In contrast to prior art pointing and tracking systems, where undetermined errors were always present, the error-free nature of LINC II tracking means that a trajectory computed for an object by one LINC II can be handed off to another LINC II, remote from the first. At the second LINC II using the trajectory from the first, can effortlessly acquire and continue tracking the object. This is in distinct contrast to prior art tracking systems wherein cooperation among diverse trackers was extremely difficult at best and sometimes impossible.

Mobile LINC II

The foregoing description is related to a stationary tracking system, e.g. a tracking system which requires a description of the trajectory of the object being tracked relative to its own, stationary, frame of references. Not all tracking systems have this requirement. In mobile trackers, where the aim is to intercept the object, there is no need for an explicit description of the trajectory of the object relative to any stationary reference. Thus the system described in FIGS. 1-5 can be modified, in connection with mobile tracking systems, in several respects. The trajectory which must be described is the object's trajectory relative to the mobile platform on which the tracking system is carried. System error, and the corresponding system error inverses need not be calculated or employed.

Further Use for the Servo Lag Detector

As described in the foregoing portions of this application, the function of the servo lag detector 25 is in overcoming servo lag errors so as to properly to sensor 32. In performing this function, one output of the servo lag detector is a modified, corrected position estimate for use in driving the servos. The other output, the output from the comparator 253 (see FIG. 2) can be used to identify the presence of servo lag and to quantize that servo lag. This output is useful in another mode of operation of the error-free pointing and tracking of this application. The operation of the invention has been described in connection with tracking a remote object. However, it is well-known to those skilled in the art that it may be necessary for a single system to track multiple remote objects. While the system, with a single sensor, can only track one object at a time, its function can be time-shared among several objects as follows. The sensor is first used to track a first remote object until a fairly good trajectory is created for that object. The sensor is then moved to track a second remote object until the trajectory for the second object is determined or modified. Thereafter, the sensor is switched to continue tracking the first object, and so on. In order to perform this function, the sensor may have to slew from the position in which it points at one remote object to a different position at which it points to the expected position of a second remote object. In the course of such a slewing function, the mount or servo is driven at a maximum rate, e.g. more than 30° per second. Typically the servos, during the course of slewing, are adjusted to provide for zero or minimum feedback, e.g. a position loop. It is well-known that a type zero or position loop will exhibit overshoot. However, when the lag detector is employed, the amount of lag is quantified so that as the lag is reduced to a predetermined level, the slewing function is terminated and the servo loop is adjusted to provide for type two operation (e.g. with acceleration memory). This will significantly reduce the overshoot of the sensor 32 with respect to the remote object. Reducing overshoot means that the sensor 32 will be correctly positioned for a larger percentage of time than it would have been positioned had it been necessary to recover from overshoot. This enlarges the capability of the error-free pointing and tracking to track multiple objects. Alternatively, this added capability can be considered to increase the number of different objects which can be tracked by a single system.

It should be apparent from the foregoing description that a number of improvements in pointing and tracking functions have been described herein. The foregoing description is considered exemplary and not limiting. Many and varied changes can be made, all within the spirit and scope of the invention which is to be construed in accordance with the attached claims.

I claim:

1. A method of tracking a remote object using a sensor positioned by a servomechanism, said method comprising the steps of:
   (a) predetermining, for said servomechanism, servo lag in accordance with one or more of object acceleration, velocity or position,
   (b) tracking said object with said sensor, and in the course of said tracking generating an estimate of acceleration, velocity and position of said object,
   (c) based on said predetermining step, generating a quantity representing servo lag from one or more of the estimates of acceleration, velocity and position from step (b), and
   (d) modifying said estimated position by said quantity generated in said step (c).

2. A method as recited in claim 1 wherein said servomechanism includes an encoder for generating signals representing sensor pointing and said step (b) includes the steps of:
   (b1) generating, from said sensor, a sequence of signals, each signal in said sequence representing a difference between object position and sensor pointing,
   (b2) testing the differences generated in said step (b1) to determine if said differences represent a trended difference,
   (b3) if the test of said step (b2) indicates said differences are trended, using said directed differences to correct a trajectory estimate, where each trajectory estimate includes terms for acceleration and velocity,
   (b4) estimating object position, to generate an estimated position, based on a trajectory estimate, where said trajectory estimate is either a trajectory estimate corrected as recited in step (b3) or a preexisting trajectory estimate if no trajectory correction per step (b3) is required,
   (b5) correcting said estimated position based on a predetermined system error model to generate a corrected position estimate and using said corrected estimated position as the estimated position in said step (d).

3. A method as recited in claim 2 which further includes the steps of:
   (e) comparing said modified estimated position of said object with said encoder-generated signals, and
   (f) indicating presence of a servo lag error in the event said modified estimated position disagrees with said encoder-generated signals.

4. A method as recited in claim 2 wherein said step (b2) includes:
   (b2a) obtaining a sequence of products where each said product is a product of sequential signals from said sensor,
   (b2b) providing a counter,
   (b2c) examining each sign of each of said products, for each product with a positive sign, decrementing said counter and for each product with a negative sign, incrementing said counter up to a predetermined threshold,
   and wherein said step (b3) includes:
   (b3a) providing an adaptive gain trajectory correction algorithm, and
   (b3b) using a state of said counter to determine a gain for said adaptive gain trajectory correction.

5. A method as recited in claim 4 wherein said step (b3) includes the further steps of:
   (b3c) summing an output of said sensor with said corrected position estimate of said step (b5) to obtain a measured object position,
   (b3d) summing said measured object position of said step (b3c) with said estimated object position of said step (b4) to obtain an object position error, and
   (b3e) using said object position error of said step (b3d) and the gain determined in said step (b3b) to execute said adaptive gain trajectory correction algorithm.

6. A method as recited in claim 5 which includes the further step of:
   (e) transmitting said modified corrected estimated position to a separate tracking and pointing system.

7. A method as recited in claim 4 which includes the further step of:
   (e) transmitting said modified corrected estimated position to a separate tracking and pointing system.

8. A method as recited in claim 2 which includes the further step of:
   (e) transmitting said modified corrected estimated position to a separate tracking and pointing system.

9. A method as recited in claim 1 which includes the further step of:

(e) transmitting said modified estimated position to a separate tracking and pointing system.

10. A method of tracking a remote object using a sensor positioned by a servomechanism which servomechanism includes an encoder for generating signals representing sensor pointing, said method comprising the steps of:
(a) tracking said object with said sensor by:
(a1) generating, from an output of said sensor, signals representing a difference between object position and sensor pointing,
(a2) in the event a difference of said step (a1) is a trended difference:
(a3) using said difference to correct a trajectory estimate, where each trajectory estimate includes terms for acceleration, velocity and position,
(a4) estimating an object position based on a trajectory estimate, where said trajectory estimate is either a trajectory estimate corrected as recited in step (a3) or a prior trajectory estimate if no trajectory correction per step (a3) is required,
(a5) correcting said estimated position based on a predetermined system error model to generate a corrected estimated position,
(b) comparing said corrected estimated position of said object with said encoder generated signals, and
(c) indicating presence of a servo lag error in the event said corrected estimated position disagrees with said encoder generated signals.

11. A method as recited in claim 10 which comprises the further steps of:
(d) predetermining, for said servomechanism, servo lag in accordance with one or more of object acceleration, velocity or position,
(e) based on said predetermining step, generating a quantity representing servo lag from one or more of the estimates of acceleration, velocity and position from step (a4), and
(f) modifying said corrected estimated position by said quantity generated in said step (e), and
(g) using said modified corrected estimated position as the corrected estimated position in step (b).

12. A method of tracking a remote object using a sensor positioned by a servomechanism, said method comprising the steps of:
(a) predetermining, for said servomechanism, servo lag in accordance with one or more of object acceleration, velocity or position,
(b) tracking said object with said sensor, and in the course of said tracking generating an estimate of acceleration, velocity and position of said object,
(c) generating, from said sensor, a sequence of signals, each signal in said sequence representing a difference between object position and sensor pointing,
(d) detecting a manuever by the object being tracked by testing the differences generated in said step (c) to determine if said differences represent a trended difference,
(e) revising said estimates of acceleration, velocity and position of said object in light of a manuever detected in said step (d),
(f) based on said predetermined step, generating a quantity representing servo lag from one or more of the estimates of acceleration, velocity and position from step (b) or step (e) in the event a manuever is detected, and
(g) modifying said estimated position by said quantity generated in said step (c).

13. A method as recited in claim 12 wherein said servomechanism includes an encoder for generating signals representing sensor pointing and which further includes the steps of:
(h) comparing said modified estimated position of said object with said encoder generated signals, and
(i) indicating presence of a servo lag error in the event said modified estimated position disagrees with said encoder generated signals.

* * * * *